United States Patent

[11] 3,545,518

| [72] | Inventor | Hans Kohlmann<br>Siebenbuchen 17, Hamburg-Blankenese,<br>Germany |
|---|---|---|
| [21] | Appl. No. | 710,507 |
| [22] | Filed | March 5, 1968 |
| [45] | Patented | Dec. 8, 1970 |
| [32] | Priority | March 7, 1967 |
| [33] | | Germany |
| [31] | | No. K61624 |

[54] PROCESS AND APPARATUS FOR CONCENTRATING AND DRYING SLUDGE
5 Claims, 3 Drawing Figs.

[52] U.S. Cl. ................................................. 159/2,
159/47, 159/17; 202/175; 203/11
[51] Int. Cl. ....................................................... B01d 1/02,
B01d 1/24, B01d 1/26
[50] Field of Search ........................................ 159/1,
1(C), 2, 2(MS), 3, 4(VMS), 17, 17(VS), 18, 20,
46, 47(WL), (Accumulator Digest 18), (Organic
Digest 10); 203/88, 90, 91

[56] References Cited
UNITED STATES PATENTS

| 2,148,579 | 2/1939 | Reich | 159/47 |
|---|---|---|---|
| 2,182,272 | 5/1938 | Smith | 23/126 |
| 2,636,555 | 4/1953 | Klepetko et al. | 159/48X |
| 2,823,742 | 2/1958 | Ludin et al. | 159/24 |
| 3,072,626 | 1/1963 | Cines | 260/93.5 |
| 3,081,290 | 3/1963 | Cottle | 260/94.9 |
| 3,084,149 | 4/1963 | Stevens et al. | 260/94.9 |
| 3,119,752 | 1/1964 | Checkovich | 203/11 |
| 3,218,241 | 11/1965 | Checkovich | 203/88X |
| 3,234,994 | 2/1966 | Dance | 159/47 |
| 3,320,137 | 5/1967 | Jebens et al. | 202/173 |
| 3,420,747 | 1/1969 | Williamson | 203/11X |

Primary Examiner—Norman Yudkoff
Assistant Examiner—J. Sofer
Attorney—Karl F. Ross

ABSTRACT: Wet sludge is heated under pressure to a temperature above 100° C. and is then admitted into an expansion vessel where some of the water evaporates; the residue is subjected to further drying on a set of heated platforms whose temperature may be controlled by the hot vapors from the expansion vessel.

PROCESS AND APPARATUS FOR CONCENTRATING AND DRYING SLUDGE

My present invention relates to a process and an apparatus for the settling of an aqueous suspension of solid matter, such as sewage or other sludge.

In the disposal of such matter, or in the recovery of solids therefrom, it is generally desirable to remove as much water as possible so that the residue can be stored and transported in space of reduced dimensions. For this purpose it has hitherto been customary to subject the suspension to filtration which, in the case of waste disposal plants and other installations of this type, usually requires large filtering surfaces.

The principal object of my present invention is to provide a process and means for at least partly predrying sludge or the like in a manner designed to drive off a large portion of its initial water content so that subsequent filtration may be carried out with the aid of considerably reduced filtering surfaces, or may be even completely eliminated with the predried mass simply subjected to a final air-drying step.

A more particular object of this invention is to provide a system for automatically predrying such suspensions in a continuous manner, regardless of changing compositions and moisture content.

I have found in accordance with this invention that the aforestated objects may be realized by subjecting the sludge or other aqueous suspension of solids to a heat treatment designed to vaporize a substantial portion of the water content thereof, this vaporization taking place in an expansion vessel into which the suspension is admitted after being heated to a temperature above the boiling point of water. To insure an effective and uniform heating to the desired temperature, the suspension is guided through a heating chamber with creation of enough turbulence to effect a substantial homogenization of the mass which is thereby conditioned for more expeditious air-drying or filtration at a later stage. Because of the high temperatures involved, this mass is relatively fluid and may therefore be passed through a conduit system of a heat exchanger without danger of clogging and incrustation. To this end, however, it is necessary to prevent premature evaporation of the water wherefore I prefer to maintain the heated mass in the heating chamber under a sufficient superatmospheric pressure which is relieved only upon entry of the mass into the expansion vessel. There, the evolving steam is led off for utilization as a heat source, advantageously to preheat the freshly added sludge and/or to heat auxiliary equipment serving as an afterdrier. A portion of the residue remaining in the expansion vessel may be recirculated through the heating chamber, together with preferably preheated fresh sludge added continuously or periodically while the remainder is discharged to the afterdrier.

Thus, the system according to my invention affords a very rational mode of treatment for sludge or the like to be thickened, with the admission of outside heat required only at one point. In fact, the high-pressure heat exchanger may be subdivided into several stages each followed by an associated expansion vessel, the vapors from that vessel being then used to heat a preceding or a subsequent stage. The expansion vessel of the final stage may be maintained under partial vacuum, as may be the enclosure of the afterdrier which advantageously comprises a set of heated platforms successively receiving the partially dried mass from the last expansion stage. The latter equipment may be similar to that described in pending application Ser. No. 657,683, filed 1 Aug. 1967 by Heinz G. Kessler, now U.S. Pat. No. 3,460,269 issued 12 Aug. 1969.

The above and other objects, features and advantages of the present invention will become more readily apparent from the following description, reference being made to the accompanying drawing in which.

Figure 2:
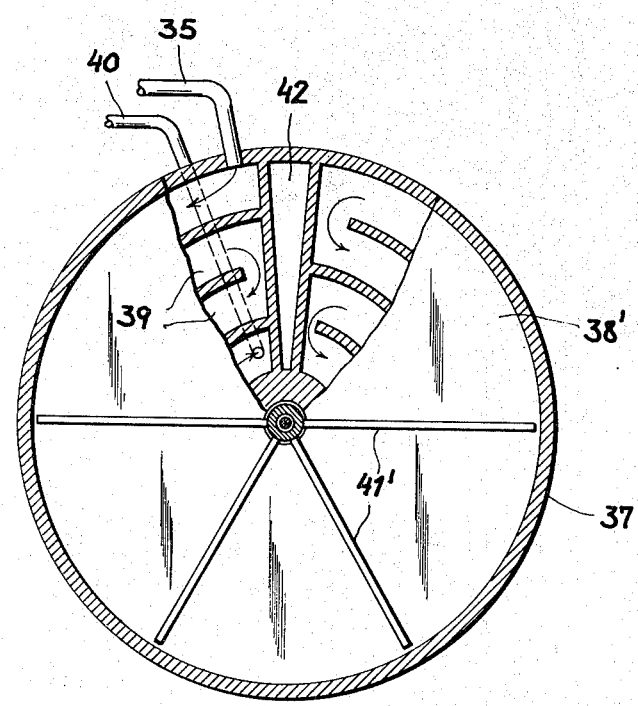
FIG. 2 is a cross-sectional view generally taken on the line II–II of FIG. 1 but with parts broken away.

The plant shown in FIG. 2 comprises a preheated 10 having a pipe 11 for the passage of sludge from the outlet 12 of a sewage system or the like. Pipe 11, which includes a supply pump 30, merges at 13 with a recirculation pipe 14 and terminates at a pump 15 which delivers the sludge to a coiled pipe 16 in a first heating chamber 17 traversed by hot gas from a source not shown. The heating gas is admitted through an inlet pipe 18 and removed through an outlet pipe 19 although, of course, the coil 16 could also be placed directly in a flue or similar environment having the necessary temperature. Generally, the temperature of the sludge should range between 115° and 150° C for best results; the operating speed of pump 15 and the cross-sectional area of coil 16 should be so chosen as to avoid laminar flow and insure a high degree of turbulence to homogenize the suspension, thereby in turn improving the heat exchange between the hot gas and the sludge.

A throttle valve 20 in the outlet of heat exchanger 17 serves to maintain the sludge in coil 16 under sufficient pressure (due to Pump 15) to prevent the formation of vapor pockets.

Beyond that throttle valve, a connection 21 leads to an expansion vessel 22 which may be maintained under a pressure slightly higher than atmospheric and wherein some of the water from the suspension escapes through a conduit 24 in the form of superheated steam. The steam traverses a second-heating chamber 25 through which the residual mass from vessel 22 is conducted via a coil 26, this residue being propelled by a pump 27 which also increases the pressure of the heated mass as it moves through another throttling valve 28 and a connection 29 to a second expansion vessel 31. The spent vapors from chamber 25 are returned to preheater 10 via a line 32. The vapors rising from vessel 31 are delivered through a pump 33 to an afterdrier, generally designated 34, by way of a distributing manifold 35; pump 33 helps maintain a partial vacuum in vessel 31.

The afterdrier 34, to which the predried mass not recirculated via conduit 14 is delivered by way of a pump 36, comprises a generally cylindrical housing 37 containing a stack of several (here three) superposed platforms 38, 38', 38" centered on a horizontal axis. These platforms are of hollow construction and, as best seen in FIG. 2 for platform 38', form internal channels 39 through which the steam admitted from manifold 35 meanders until it is discharged through a collecting manifold 40 also leading to preheater 10. A set of scrapers 41, 41', 41" sweep the upper surfaces of platforms 38, 38', 38", these platforms being provided with relatively staggered radial gaps 42 (FIG. 2) through which the mass previously deposited thereon is swept onto the next lower platform or, in the case of the lowest platforms 38", into a passage 43 containing a screw-type discharge conveyor 44 driven by a motor 45. An outlet chute 46 delivers the nearly dried mass to a receptacle or a further conveyor not shown.

Since the sludge descending from the top platform 38 to the bottom platform 38" progressively decreases in bulk, a more uniform spread is obtained by driving the rotary scrapers 41, 41', 41" at different speeds. This accomplished with the aid of a motor 47 whose shaft 48 carries pinions 49, 49', 49" meshing with respective gears 50, 50', 50" keyed to the corresponding scraper shafts 51, 51', 51".

A pump 52 draws the vapors from housing 37 and maintains a partial vacuum therein to expedite evaporation. These vapors are also fed back to preheater 10 through a conduit 53. A condensate outlet 54 serves to discharge the moisture introduced into the preheater chamber through pipes 32, 40 and 53.

Since the oncoming sludge may be delivered by source 12 at widely varying rates, it will be desirable to make compensatory adjustments in order to prevent underutilization or overflow of the expansion vessels 22, 31. For this purpose I prefer to provide a float-type governor 55, 56 in each of these vessels, this governor electrically controlling the associated pump 27 or 36 through a respective signal wire 57, 58 in order to maintain an approximately constant level of sludge within these vessels. Thus, for example, the drive motors associated with these pumps may be operable at two distinct speeds and may be switched from higher to lower speed or vice versa whenever the sludge level within the vessel reaches a predetermined upper or lower limit. By thus adjusting the rate of recirculation, I may adapt the operation of the system to the overall quantity of the arriving sludge and to the proportion of its solids. A certain amount of level control may also be had by varying the temperature or the flow rate of the heating gas in response to floats 55, 56 or equivalent monitoring devices.

Figure 1:
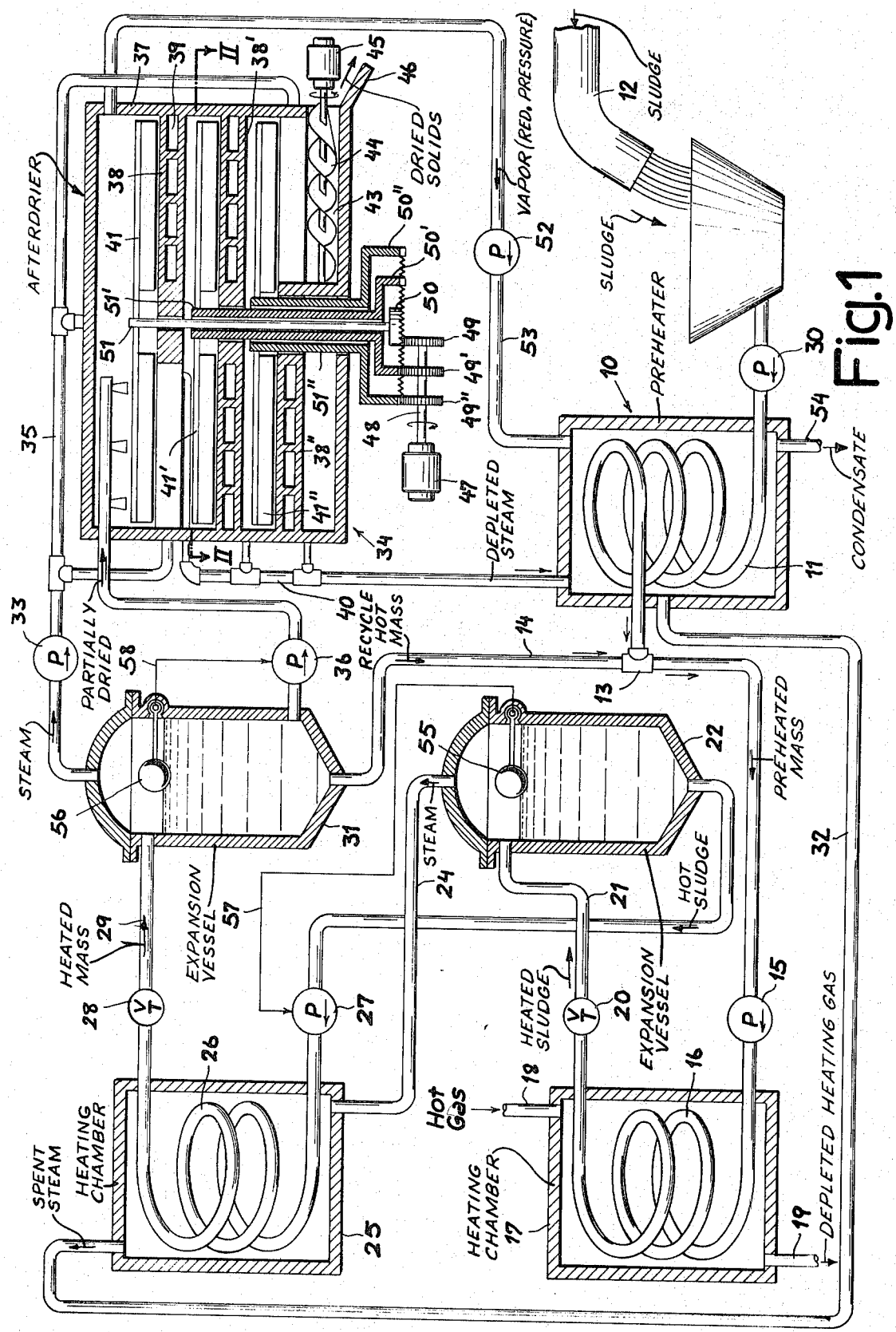
FIG. 1 is a somewhat diagrammatic view of a sludge-settling plant according to the invention.

In a continuously operating system, the externally generated heating fluid may also be fed to the final heat-exchanger stage 25, rather than to an earlier stage as shown in FIG. 1, with stage 17 heated by the locally produced steam and by the hot recirculated mass from conduit 14. In this case the heating fluid directly controls the temperature of the suspension admitted into the final expander 31.

Figure 3:
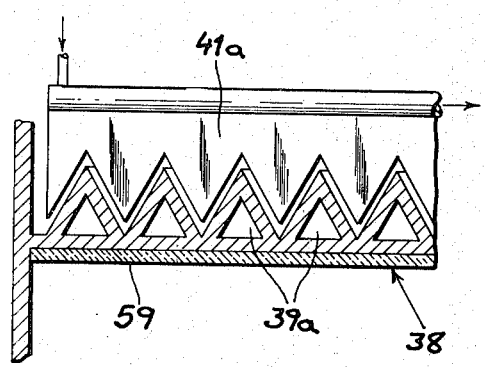
FIG. 3 is a detail view illustrating a modification of the assembly shown in FIG. 2.

The afterdrier 34, whose construction is similar to that of the drying apparatus disclosed in the aforementioned Kessler application Ser. No. 657,683, may be modified in various respects, e.g. by using ducts 39a of triangular profile to give each platform 38a a serrated surface as illustrated in FIG. 3, thereby increasing the effective heating area; the cooperating scraper bar 41a is similarly serrated. FIG. 3 further shows the presence of a thermally insulating layer 59 on the underside of the platform to increase the heating efficiency. Also, these platforms need not be disk-shaped but may be of rectangular or other convenient configuration, with staggered edges to permit the successive transfer of partly dried bulk material from a higher platform to a lower one; if desired, the scrapers themselves may be traversed by the heating fluid. The number of these platforms may likewise be varied, as may be the number of heating and expansion stages 17, 22 and 25, 31; in many instances a one-stage heat exchanger will suffice, particularly where inexpensive external heat is abundantly available.

I claim:
1. A plant for thickening sludge or the like, comprising:
a heating chamber;
conduit means for continuously passing through said chamber an aqueous suspension of solids to be recovered;
main heating means for raising the temperature of said suspension in said chamber above 100° C;
forced-circulation means for maintaining said suspension within said chamber in a state of compression sufficient to prevent substantial evaporation of water therefrom;
an expansion vessel provided with a connection for receiving the heated suspension from said chamber, said circulation means including back pressure flow-throttling means in said connection;
discharge means for removing a partly dewatered mass of said solids from said vessel;
afterdrier for the mass removed from said vessel by said discharge means;
inlet means for delivering fresh suspension to said conduit means;
preheating means for said fresh suspension in said inlet means; and
recirculating means for branching off a portion of said mass from said vessel upstream of said afterdrier and returning said portion to said chamber together with said preheated fresh suspension, said afterdrier including at least one platform provided with conduit means for the passage thereinto of hot vapors from said vessel.

2. A plant as defined in claim 1, further comprising regulating means for maintaining a substantially constant flow of fresh and recirculated mass through said vessel.

3. A plant as defined in claim 1, further comprising duct means for channeling spent vapors from the concentrated mass in said afterdrier to said preheating means to establish the temperature of said fresh suspension in said inlet means.

4 A plant for thickening sludge or the like, comprising:
a heating chamber;
conduit means for continuously passing through said chamber an aqueous suspension of solids to be recovered;
main heating means for raising the temperature of said suspension in said chamber above 100° C;
forced-circulation means for maintaining said suspension within said chamber in a state of compression sufficient to prevent substantial evaporation of water therefrom;
an expansion vessel provided with a connection for receiving the heated suspension from said chamber, said circulation means including back pressure flow-throttling means in said connection;
discharge means for removing a partly dewatered mass of said solids from said vessel;
afterdrier for the mass removed from said vessel by said discharge means;
inlet means for delivering fresh suspension to said conduit means;
preheating means for said fresh suspension in said inlet means; and
recirculating means for branching off a portion of said mass from said expansion vessel upstream of said afterdrier and returning said portion to said heating chamber together with said preheated fresh suspension.

5. A process for thickening sludge and like solid-containing liquid streams, comprising the steps of;
passing the stream through a succession of vaporization stages for thickening the stream;
heating the thickened stream in the heat exchanger of the last vaporization stage by indirect heat-transferring relationship with an externally supplied fluid to a temperature and at a pressure such that the thickened stream flows substantially turbulently through the heat exchanger without substantial evaporation; and
thereafter admitting the heated stream into a region of reduced pressure for at least further partial evaporation of the liquid content of the stream to form a partly dewatered mass, the partly dewatered mass being continuously reheated and recirculated through said heat exchanger in turbulent flow together with a preheated fresh stream admixed therewith a circulating part of the mixed stream repeatedly through at least one of said vaporization stages said stream being a sewage sludge and said temperature ranges between substantially 115° and 150° C.